United States Patent [19]

Tokoro et al.

[11] Patent Number: 4,601,680
[45] Date of Patent: Jul. 22, 1986

[54] CONTROL APPARATUS FOR USE OF A CONTINUOUSLY VARIABLE TRANSMISSION

[75] Inventors: Setsuo Tokoro; Tomoyuki Watanabe; Takashi Shigematsu, all of Susono, Japan

[73] Assignee: Toyota Jidosha Kabushiki Kaisha, Japan

[21] Appl. No.: 712,608

[22] Filed: Mar. 18, 1985

[30] Foreign Application Priority Data

Apr. 18, 1984 [JP] Japan .................................. 59-76682

[51] Int. Cl.⁴ ............................................ F16H 11/06
[52] U.S. Cl. .......................................... 474/11; 474/28
[58] Field of Search ....................... 474/11, 17, 18, 28; 74/865, 867

[56] References Cited

U.S. PATENT DOCUMENTS 4,403,974 9/1983 Sherman et al. ................... 474/28 X
4,543,077 9/1985 Yamamuro et al. ............... 474/28 X
4,547,178 10/1985 Hayakawa et al. ............... 474/28 X Primary Examiner—James A. Leppink
Assistant Examiner—Frank McKenzie
Attorney, Agent, or Firm—Parkhurst & Oliff

[57] ABSTRACT

A control apparatus for use of a continuously variable transmission. The apparatus controls a rate of changing a RPM ratio in a continuously variable transmission connected to the engine. The transmission has a driving pulley mounted on an input shaft a driven pulley mounted on an output shaft, and an endless belt member spanning the pulleys so that an effective diameter of the pulleys can be varied at different rates with regard to each other so that different speed ratios can be obtained. When a prompt acceleration of a vehicle is required by an operator, a flow control device drains an amount of oil in a hydraulic cylinder of the driving pulley within a first prescribed time period. During a second prescribed time period after the first prescribed time period elapses, a second control device stops the draining of oil in the hydraulic cylinder, thereby maintaining a RPM ratio in a continuously variable transmission to the value at the time when the first prescribed time period elapses.

6 Claims, 8 Drawing Figures

4,601,680

CONTROL APPARATUS FOR USE OF A CONTINUOUSLY VARIABLE TRANSMISSION

BACKGROUND OF THE INVENTION

The present invention relates to a control apparatus for use of a continuously variable transmission, and more particularly to an apparatus for controlling a speed ratio between an input pulley and an output pulley of a continuously variable transmission.

There has been known a continuously variable transmission (CVT) comprising a torque transmitting belt extending between an input (driving) pulley and an output (driven) pulley, the ratio capable of being varied (ratio being defined as the RPM or speed ratio between the input and output pulleys), by adjusting the size of a V-shaped groove(s) in one or both of the pulleys as a result of the variation of the pressure which forces the belt into groove(s). Thus, the position of the belt on the pulleys and the effective diameter of the pulleys can be varied, which makes it possible to continuously vary the ratio between the input and output pulleys.

In a vehicle equipped with a CVT, a desired engine speed is set to such a value as a required horsepower is obtained at a minimum fuel consumption, and a speed ratio e of a CVT (e=$RPM_{out}/RPM_{in}$, $RPM_{out}$: a rotation speed of a driven pulley, $RPM_{in}$: a rotation speed of a driving pulley) is controlled by hydraulic cylinders so that an actual engine speed may become equal to a desired engine speed. Hence, an engine speed of a vehicle in which a CVT is equipped, is made to a smaller value than that of a vehicle in which a manual transmission or an automatic transmission is equipped. Even in a vehicle in which a CVT is equipped, it is necessitated to promptly increase an engine speed when a prompt acceleration of a vehicle is required. When a time for changing a speed ratio of a CVT lasts for a long time, the increased engine torque is used mostly in order to further increase an engine speed.

SUMMARY OF THE INVENTION

The present invention was made in view of the foregoing background and to overcome the foregoing drawbacks. It is accordingly an object of this invention to provide a control apparatus for use of a continuously variable transmission, which obtains the prompt acceleration of a vehicle.

To attain the above object, an apparatus according to the present invention controls a rate of changing a RPM ratio in a conitnuously variable transmission which is connected to an engine. The transmission has a driving pulley mounted on an input shaft, a driven pulley mounted on an output shaft, and an endless belt member spanning the pulleys so that an effective diameter of the pulleys can be varied at different rates with regard to each other so that different speed ratios can be obtained. The driving pulley comprises a fixed member and a movable member which is actuated by a hydraulic cylinder to form a V-shaped opening between the movable member and the fixed member. Similarly, the driven pulley comprises another fixed member and another movable member which is actuated by another hydraulic cylinder to form another V-shaped opening between said another movable member and said another fixed member. A first means detects a signal which indicates a prompt acceleration of a vehicle, required by an operator. A flow control means drains an amount of oil in the hydraulic cylinder of the driving pulley within a first prescribed time period from the time when the prompt acceleration of a vehicle is detected by the flow control means. A second control means maintains an amount of oil supplied into the hydraulic cylinder of the driving pulley to zero during a second prescribed time period after the first prescribed time period elapses. A regulator means supplies a pressurized line pressure into the flow control means and the another hydraulic cylinder.

BRIEF DESCRIPTION OF THE DRAWINGS

The above object, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
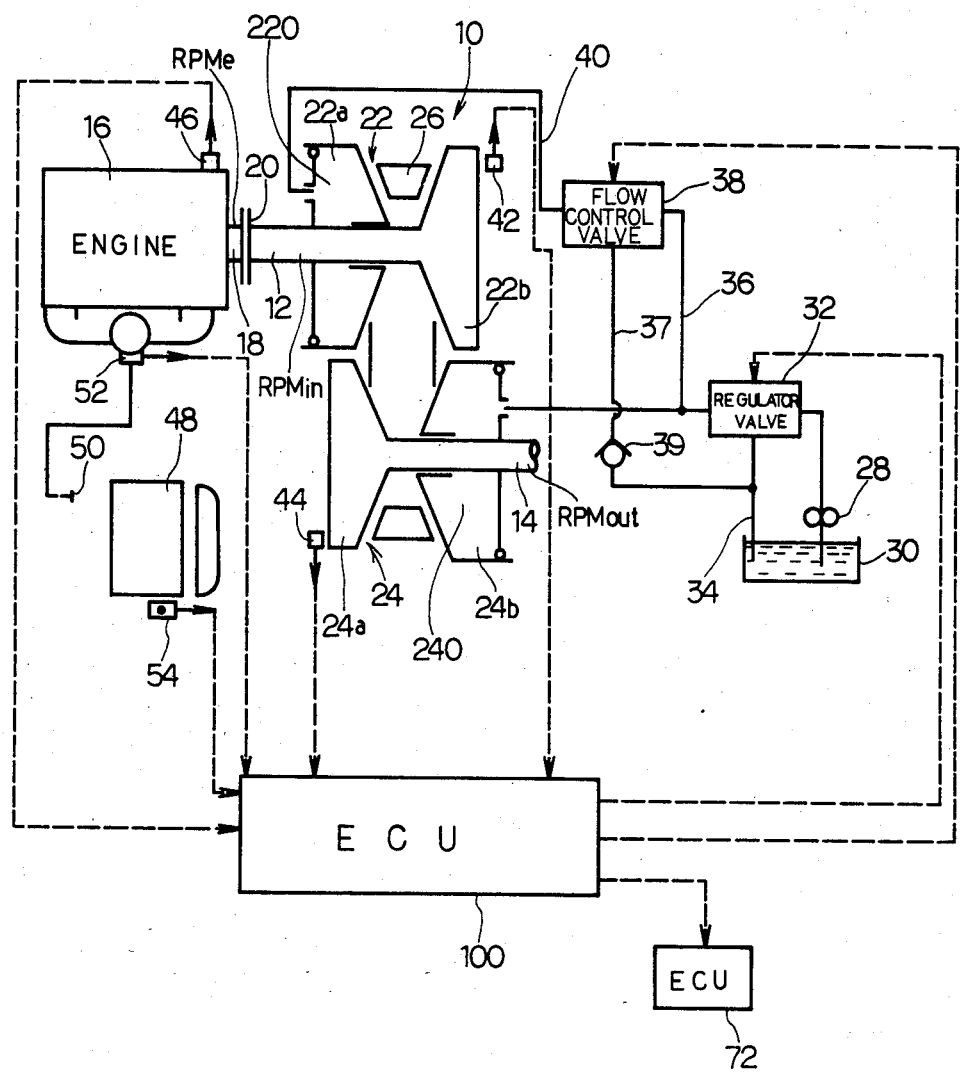
FIG. 1 is a schematic view of a hydraulic control apparatus according to the present invention.

FIG. 1 illustrates a schematic view of a hydraulic control apparatus according to the present invention. An engine 16 is connected through a crank shaft 18 and a clutch 20 with a shaft 12. The shaft 12 is an input shaft connected with a continuously variable transmission (CVT) 10. The CVT 10 has a couple of pulleys 22 and 24. The pulley 22 is a driving pulley mounted on the driving and input shaft 12 which is driven by the engine 16. The other pulley 24 is a driven pulley mounted on a driven and output shaft 14. The torque of the shaft 14 is outputted to wheels (not shown in drawings). A torque transmitting continuous V-belt 26 extends between the pulleys 22 and 24. The driving pulley 22 has a movable member 22a, which is axially displaced on and rotates with the input shaft 12, and a fixed member 22b, which is fixed to and rotates with the input shaft 12. The movable member 22a is axially displaced by the pressure $P_{in}$ exerted upon it by a hydraulic cylinder 220. When the movable member 22a is axially displaced in a direction toward the opposite member 22b, the width defined between the members 22a and 22b is decreased. The amount of the oil supplied to the cylinder 220 is controlled by a flow control valve 38. This results in an increase in the effective diameter of the driving pulley 22. As a result, the RPM ratio "e" i.e., (the rotation speed of the driven pulley 24)/(the rotation speed of the driving pulley 22), ($RPM_{out}/RPM_{in}$) is increased. The $RPM_{in}$ is governed by the engine RPM which is represented by $RPM_e$. When the amount of the oil released from the cylinder 220 through the flow control valve 38 is controlled, the RPM ratio is decreased.

Similarly, the driven pulley 24 has a movable member 24b, which is axially displaced on and rotates with the output shaft 14, and a non-movable member 24a, which is fixed to and rotates with the output shaft 14. The movable member 24b is axially displaced in a direction toward the opposite member 24a, the width defined between the members 24a and 24b is decreased. This results in an increase in the effective diameter of the driven pulley 24.

To minimize the amount of engine power consumed by a hydraulic fluid pump 28, the hydraulic pressure in the cylinder 240 is controlled to be as small as possible while maintaining a torque necessary to keep the belt 26 from slipping while rotating around the driving pulley 22 and the driven pulley 24. The hydraulic pressure of the cylinder 220 is varied to adjust the speed ratio. The amount of pressure in the hydraulic cylinder 220 is designed to be smaller than that of the hydraulic pressure in the hydraulic cylinder 240. However, even though the value of the hydraulic pressure supplied to the hydraulic cylinder 220 is less than the value of the hydraulic pressure supplied to the hydraulic cylinder 240, the system is designed so that a greater overall hydraulic pressure is realized in the hydraulic cylinder 220 than in the hydraulic cylinder 240 because the cylinder 220 has the larger square exerted upon by the hydraulic pressure than that of the hydraulic cylinder 240. Hence, it is possible to obtain a RPM ratio of more than or at least equal to one. The CVT 10 is applied with hydraulic fluid by using the following procedure:

The hydraulic fluid pump 28, driven by a motor, pumps hydraulic fluid from a reservoir 30 to a pressure regulator valve 32. The pressure regulator valve 32 controls the pressure of the fluid supplied to an oil passage 36 by adjusting an amount of fluid released from the system, thereby generating a specific line pressure $P_L$ in the oil passage 36. The pressure regulator valve 32 supplies the line pressure $P_L$ through the oil passage 36 to the hydraulic cylinder 240 of the driven pulley 24 and to the flow control valve 38. The flow control valve 38 is a three port connection valve, and includes an inlet port communicated with the oil passage 36, a drain port communicated with a drain passage 37 and an outlet port communicated through an oil passage 40 with the hydraulic cylinder 220 of the driving pulley 22. When the flow control valve 38 is in a first position, the inlet port communicates with the outlet port. When the flow control valve 38 is in a second position, there is no communication between the three ports. Finally, when the flow control valve 38 is in a third position, the outlet port communicates with the drain port. A check valve 39 is provided on the drain passage 37. The check valve 39 only allows hydraulic fluid to flow in a single direction, from the flow control valve 38 to the hydraulic fluid reservoir 30.

When the hydraulic pressure of the cylinder 240 of the movable member 24b of the driven pulley 24 increases, the movable member 24b is displaced to approach to the opposite member 24a. Due to this, the contact points between the driven pulley 24 and the belt 26 move to the points which are positioned in the outer portions of the driven pulley 24. The amount of the line pressure $P_L$ is controlled so that it may not cause the slip between the belt 26 and the driven pulley 24. When the hydraulic pressure in the cylinder 220 of the driving pulley 22 increases, the movable member 22a of the driving pulley 22 is displaced to approach to the opposite member 22b. Due to this, the contact points between the driving pulley 22 and the belt 26 move to the point which are positioned in the outer portions of the driving pulley 22. Thus, the speed ratios between the driving and driven pulleys are controlled.

Figure 2:
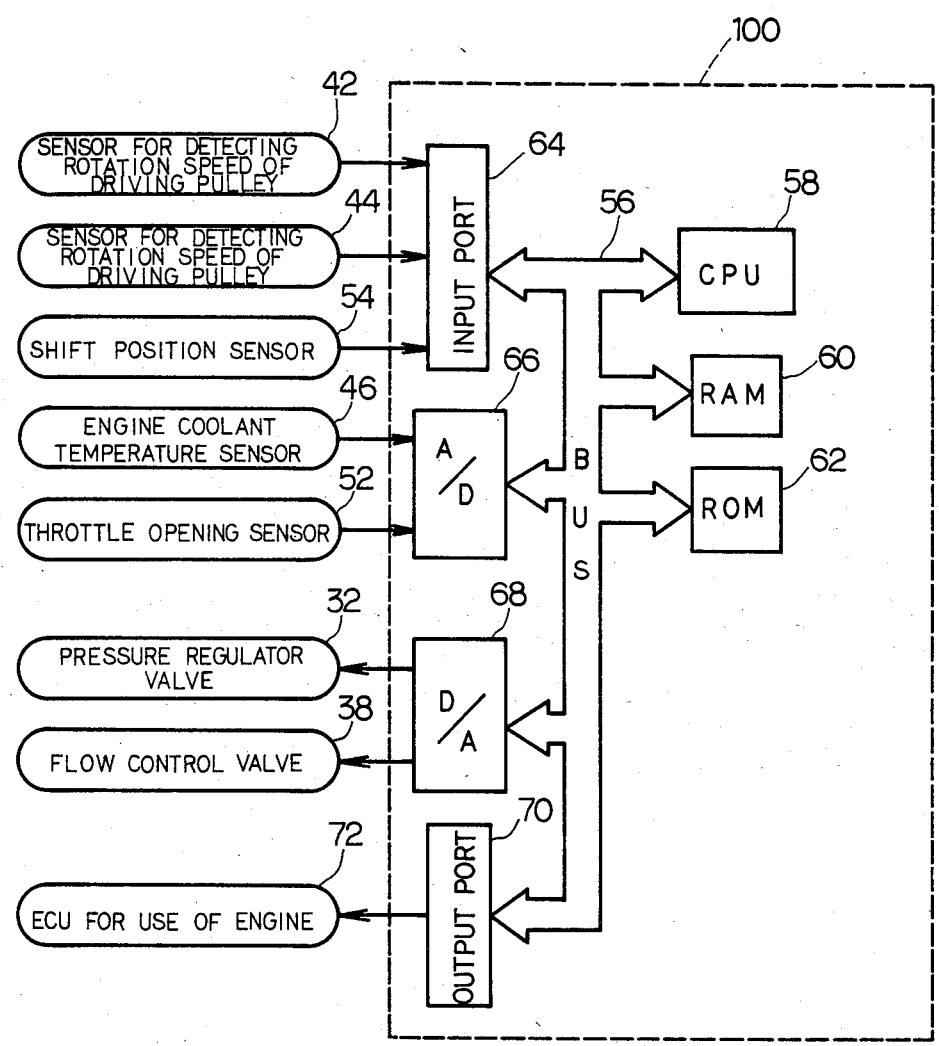
FIG. 2 is a circuit diagram of an electronic control unit employed in the present invention.

FIG. 2 illustrates a circuit diagram of an electronic control unit (hereinafter referred to as ECU) employed in the present invention.

A sensor 42 detects the rotation speed $RPM_{in}$ of the driving pulley 22. A sensor 44 detects the rotation speed $RPM_{out}$ of the driven pulley 24. A sensor 54, mounted near a passenger seat 48, detects the position of a shift lever of the transmission. In case of an automatic transmission, the sensor 54 detects the shift range of the transmission. An engine coolant temperature sensor 46 is mounted adjacent a cylinder block of the engine 16 and detects the temperature of the engine coolant. A throttle opening sensor 52 detects an amount of a throttle opening of a throttle valve, which varies in proportion to a stroke of an accelerator pedal 50 installed adjacent to the passenger seat 48.

The signals detected by the foregoing sensors are inputted to the ECU 100.

The ECU 100 controls the pressure regulator valve 32 and the flow control valve 38 in accordance with the signals detected by the various sensors. FIG. 2 shows that the ECU 100 functions as a digital computer, and has a central processing unit (hereinafter referred to as CPU) 58 which carries out arithmetic and logic processing functions, an input port (hereinafter referred to as I/P) 64, an analog-digital converter (hereinafter referred to as A/D) 66, a random-access memory (hereinafter referred to as RAM) 60 which temporarily stores the calculated data of the CPU 58, a read-only memory (hereinafter referred to as ROM) 62 which stores a prescribed control program and arithmetic constants therein, a digital-analog converter (hereinafter referred to as D/A) 68, and an output port (hereinafter referred to as O/P) 70. These components are connected by a common bus 56.

An example of how the ECU 100 functions is given by the following: The I/P 64 receives an output signal from the sensor 42 corresponding to the rotation speed of the driving pulley 22 ($RPM_{in}$), an output signal from the sensor 44 corresponding to the rotation speed of the driven pulley 24 ($RPM_{out}$), and an output signal from the shift position sensor 54. The A/D 66 receives the output signals from the engine coolant temperature sensor 46 and the throttle opening sensor 52. The CPU 58, a microprocessor, then compares the outputs received against any stored information, and issues outputs to the D/A 68 which then subsequently outputs any appropriate instructions to the pressure regulator valve 32 and the flow control valve 38. Further, the ECU 100 issues an output to an ECU 72 for use of the engine 16, which controls an amount of fuel to be injected and an ignition timing of a spark plug.

In this embodiment, a computer for use of an engine is provided in addition to a computer for use of a CVT, but it is possible to employ one computer for both use of an engine and a CVT.

Figure 3:
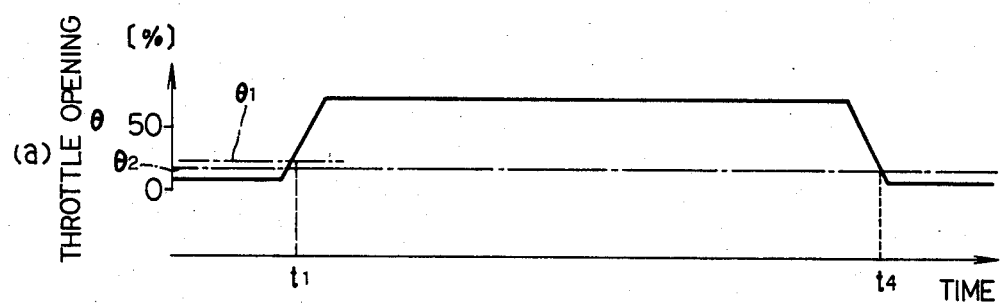
FIG. 3 is a graph which shows a variation of a throttle opening and a differential value of a throttle opening according to the lapse of time.
Figure 3:
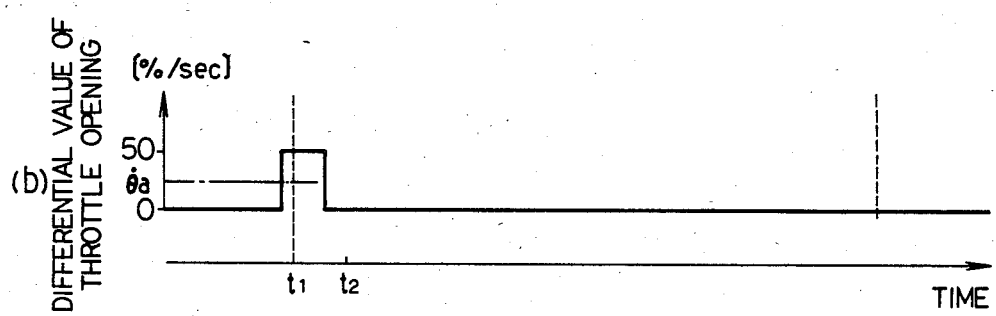

FIG. 3 illustrates the change of a throttle opening under the condition that a prompt acceleration of a vehicle is required by an operator. When an operator needs a prompt acceleration of a vehicle, the accelerator pedal 50 is promptly displaced up to a large stroke.

According to the operation, a throttle opening $\theta$ promptly increases at the time $t_1$. In FIG. 3 (a), the amounts of throttle openings $\theta_1$ and $\theta_2$ are prescribed openings. For example, the amount of the throttle opening $\theta_1$ is 30 to 70%. The throttle opening $\theta_2$ is determined to be less than $\theta_1$. In FIG. 3 (b) $\dot{\theta}$ is defined as a differential value of a throttle opening $\theta$. When the throttle opening $\theta$ becomes more than the prescribed value $\theta_1$ and the differential value $\dot{\theta}$ of the throttle opening becomes more than a prescribed value $\dot{\theta}_a$, a rich signal, which indicates such a signal as a rich mixture of fuel and air is supplied upon the receipt of the rich signal is generated. For example, the amount of $\dot{\theta}a$ is 50 to 200%/sec. In this embodiment, a rich signal is issued at the time $t_1$. This rich signal is continuously issued until the time $t_4$ when the throttle opening $\theta$ becomes less than the prescribed opening $\theta_2$.

Figure 4:
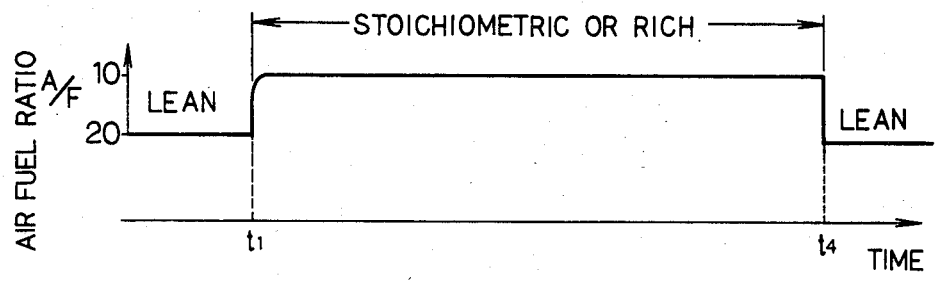
FIG. 4 is a graph which shows a variation of an air-fuel ratio.

The engine, in which the CVT 10 is equipped, is designed to be ordinally supplied with a lean mixture. However, while a rich signal is issued, an amount of fuel to be injected increases and hence a stoichiometric or rich mixture is supplied into an engine. In FIG. 4, a lean mixture is supplied into an engine during the time period up to the time $t_1$. As the throttle opening $\theta$ increases at the time $t_1$, an air-fuel ratio A/F increases, thereby becoming a small value by which a stoichiometric or rich mixture is supplied. Thereafter, when the throttle opening $\theta$ becomes less than the prescribed value at the time $t_4$, an air-fuel ration becomes a large value. Lean mixture is again supplied into an engine.

Figure 5:
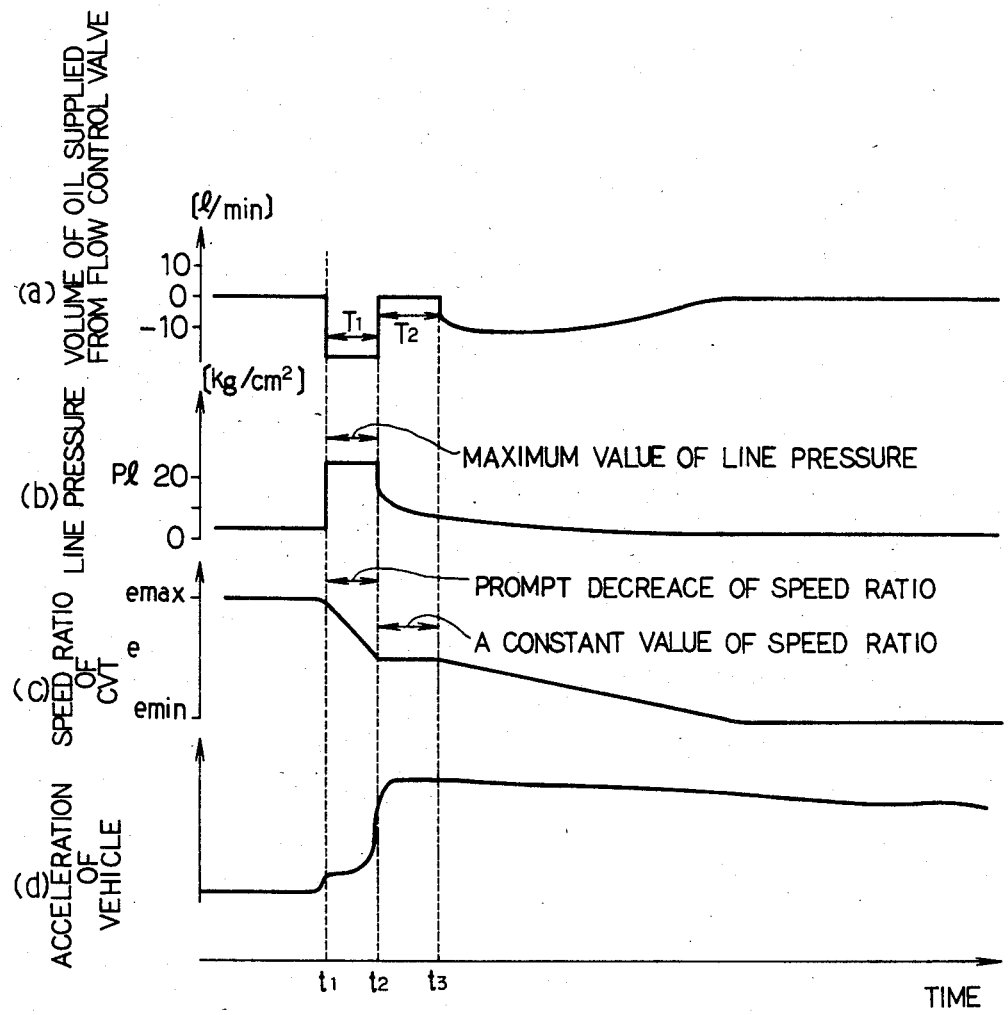
FIG. 5 is a graph which shows a volume of oil supplied from a flow control valve, a line pressure, a speed ratio of CVT, and an acceleration of vehicle.

FIG. 5(a) illustrates the volume of oil supplied from the flow control valve 38. FIG. 5(b) illustrates the change of a line pressure $P_L$ according to a lapse of time. FIG. 5 (c) illustrates a speed ratio of the CVT 10. FIG. 5 (d) illustrates an acceleration of a vehicle.

During the prescribed time period $T_1$ from the time $t_1$ to the time $t_2$, the opening of a drain port of the flow control valve 38 is maintained to the maximum. For instance, the prescribed time period $T_1$ is 0.5 to 1.0 second, and further the line pressure $P_l$ generated by the regulator valve 32 is maintained to the maximum value, as shown in FIG. 5 (b). As the line pressure $P_L$ is maintained to the maximum value, the amount of the pressure exerted between the driven pulley 24 and the belt 26 increases. The belt 26 increases the force against the pulley 22 in the direction that the pulley 22a becomes away from the pulley 22b. Further, as the opening of the drain port of the flow control valve 38 is maintained to the maximum value, the oil in the hydraulic cylinder 220 of the driving pulley 22 is promptly drained within the prescribed time period $T_1$. As a result, the speed ratio e promptly decreases, thereby increasing the torque transmitted by the CVT 10.

After the prescribed time period $T_1$ elapses, the amount of oil in the hydraulic cylinder 220 is maintained to zero during the prescribed time period $T_2$ from the time $t_2$ to the time $t_3$. For instance, the prescribed time period $T_2$ is 0.2~0.5 seconds. The speed ratio e is maintained to the value at the time $t_2$ during the time period $T_2$. If it takes a long time in order to lower the speed ratio e, the increased engine torque is consumed for the use of increasing an engine speed, and the acceleration of a vehicle is delayed. According to the present embodiment, the time period when the speed ratio e lowers is limited to the prescribed period $T_1$, and the speed ratio e is maintained to the value at the time $t_2$. Hence, a part of the increased engine torque is consumed for the use of increasing an engine speed and most of the increased engine torque is employed to increase a torque which accelerates a vehicle.

After the time $t_3$, the flow control valve 38 controls the amount of oil supplied into or drained form the hydraulic cylinder of the driving pulley so that the actual engine speed may become equal to the desired engine speed.

The line pressure $P_L$ generated by the regulator valve 32 is defined by the following equation:

(1) PERIOD FROM THE TIME $t_2$ TO THE TIME $t_3$ $$P_L = K_2 19\, T_{in} \cdot ((e+1)/e) + K_3 \cdot RPM_{out}^2 + K_4 \cdot RPM_e \tag{1}$$

Figure 6:
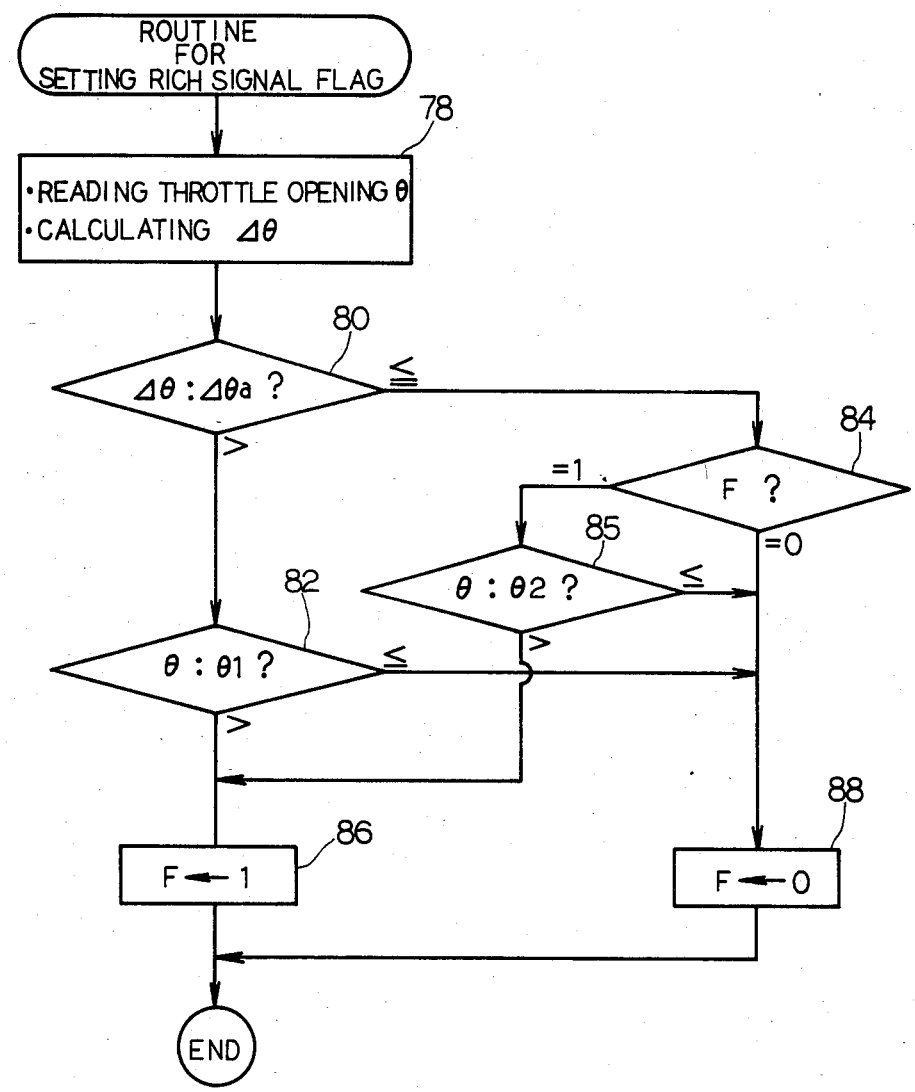
FIG. 6 is a flow chart for setting a rich signal flag.

(2) AFTER THE TIME $t_3$ $$P_L = K_2 \cdot T_{in} \cdot ((e+1)) + K_3 \cdot RPM_{out}^2 + K_4 \cdot RPM_e + K_5 \cdot \Delta x \tag{2}$$

where, $K_2$, $K_3$, $K_4$, $K_5$: constants
$T_{in}$: a torque of a driving pulley
$e$: a speed ratio of a CVT
$RPM_{out}$: a rotation speed of a driven pulley
$RPM_e$: an engine speed
$\Delta x$: a difference between a desired position of a driven pulley and an actual position of a driven pulley FIG. 6 illustrates a routine for setting a rich signal flag. In step 78, a throttle opening $\theta$ is read, and the amount of the change $\Delta\theta$ of a throttle opening $\theta$ per a prescribed time period $\theta_T$ is calculated. The amount $\Delta\theta$ corresponds to the differential of the throttle opening $\theta$. In step 80, the amount $\Delta\theta$ is compared with that of $\Delta\theta_a$. For instance, $\Delta\theta_a$ is a value between 50 and 200%/second. The amount $\Delta\theta_a$ is a prescribed value. If the amount $\Delta\theta$ is more than the amount $\Delta\theta_a$, the flow proceeds to a step 82. On the contrary, if the amount $\Delta\theta$ is equal to or less than the amount $\Delta\theta_a$, the flow proceeds to a step 84. In the step 82, a throttle opening $\theta$ is compared with the amount $\theta_1$. For instance, $\theta_1$ is a value between 30% and 70%. If a throttle opening $\theta$ is more than the amount $\theta_1$, the flow proceeds to step 86. If a throttle opening $\theta$ is equal to or less than the amount $\theta_1$, the flow proceeds to step 88. In the step 84, the value of a flag F is confirmed. If the amount of the flag F is equal to 1, the flow proceeds to step 85. If the amount of the flag F is equal to zero, the flow proceeds to a step 88. In the step 85, a throttle opening $\theta$ is compared with the amount of the prescribed throttle opening $\theta_2$. If a throttle opening $\theta$ is more than $\theta_2$, the flow proceeds to step 86. If a throttle opening $\theta$ is equal to or less than $\theta_2$, the flow proceeds to step 88, wherein a rich signal flag F of is reset.

Thus, in a routine shown in FIG. 6, a throttle opening $\theta$ and a change $\Delta\theta$ of a throttle opening per a prescribed time period are compared with the prescribed values. If a throttle opening $\theta$ is equal to or more than $\theta_1$ and $\Delta\theta$ is equal to or more than $\Delta\theta_a$, a flag F for generating a rich signal is set. After a flag F is set, the flag F is reset when a throttle opening $\theta$ is equal to or less than $\theta_2$. During the time period when the flag F is equal to 1, a rich signal is continuously issued.

Figure 7:
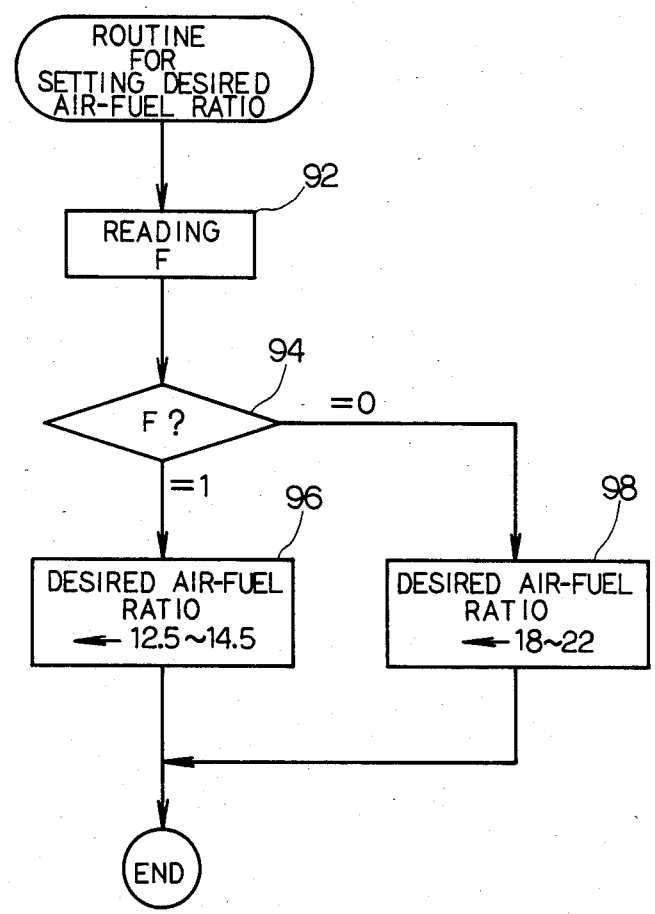
FIG. 7 is a flow chart for setting a desired air-fuel ratio.

FIG. 7 illustrates a flow chart for setting a desired air-fuel ratio. If a rich signal flag F is equal to 1, a desired air-fuel ratio is determined to be a stoichiometric air-fuel ratio or a smaller value than the stoichiometric air-fuel ratio, for instance, 12.5 to 14.5. If a rich signal flag F is equal to zero, a desired air-fuel ratio is determined to be a larger value than a stoichiometric air-fuel ratio, for instance, 18 to 22.

In step 92, a rich signal flag F is read. The flow proceeds to step 94, wherein the value of the flag F is confirmed. If the value of the flag F is equal to 1, the flow proceeds to a step 96. If the value of the flag F is equal to zero, the flow proceeds to a step 98. In the step 96, a desired air-fuel ratio is set to a value between 12.5 and 14.5. In the step 98, a desired air-fuel ratio is set to a value between 18 and 22.

Figure 8:
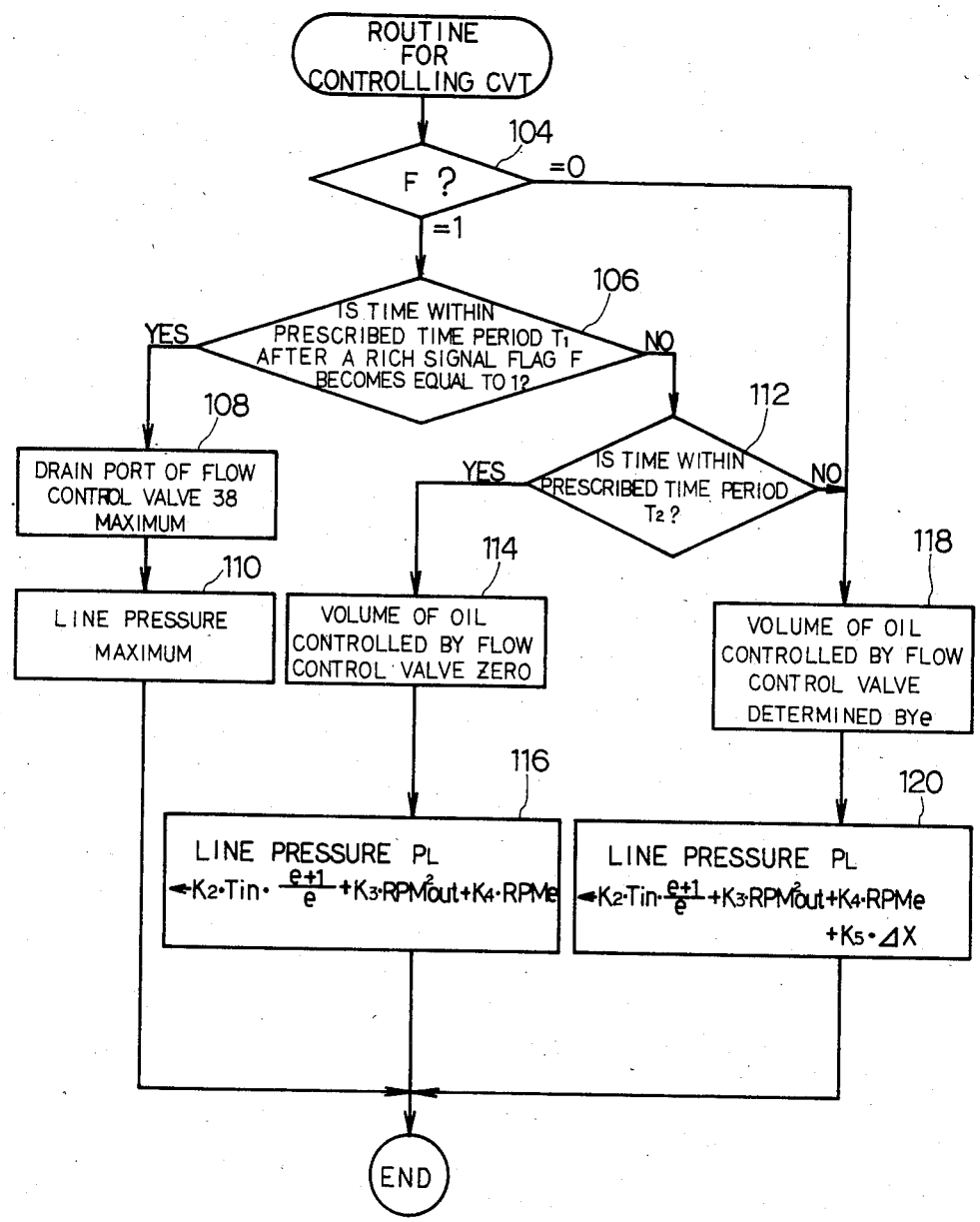
FIG. 8 is a flow chart for controlling an amount of a line pressure generated by a regulator valve.

FIG. 8 illustrates a flow chart for controlling a CVT. In a step 104, the value of a rich signal flag F is confirmed. If a rich signal flag F is equal to 1, the flow proceeds to a step 106. If a rich signal flag F is equal to zero, the flow proceeds to a step 118. In the step 106, it is determined whether the time is within the prescribed time period $T_1$ after a rich signal flag F becomes equal to 1. If the time is within the time period $T_1$, the flow proceeds to a step 108. If the time is not within the time period $T_1$, the flow proceeds to a step 112. In the step 108, an opening of a drain port of the flow control valve 38 is made to the maximum. In step 110, a line pressure generated by the regulator valve 32 is made to the maximum value. In step 112, it is determined whether the time is within the prescribed time period $T_2$ after the prescribed time period $T_1$ elapses. If the time is within the period $T_2$, the flow proceeds to a step 114. If the time is not within the period $T_2$, the flow proceeds to a step 115. In the step 114, the volume of oil controlled by the flow control valve 38 is made to zero. In the step 116, the control pressure generated by the regulator valve 32 is determined according to the regulator valve 32 is determined according to the above-described equation (1). In the step 118, a volume of oil controlled by the flow control valve 38 is determined by the speed ratio e. The flow proceeds to a step 120, wherein a control pressure of the regulator valve 32 is determined according to the above-described equation (2).

Thus, according to the flow chart shown in FIG. 6, an opening of a drain port of the flow control valve 38 is made to the maximum value during the prescribed time period $T_1$ after a rich signal flag F is set. Hence, the oil in the hydraulic cylinder of the driving pulley 22 is promptly drained. The line pressure $P_L$ generated by the regulator valve 32 is made to the maximum value. During the prescribed time period $T_2$ following the time period $T_1$, no oil is supplied into nor drained from the hydraulic cylinder of the driving pulley 22. The volume of oil in the hydraulic cylinder 220 is made to zero, and a speed ratio e is maintained to the value at the time when the prescribed time period $T_1$ elapses. The line pressure generated by the regulator valve 32 is made to the value defined by the above-described equation (1). The flow control valve 38 is controlled by a feed back control of a speed ratio e at the time other than the time periods $T_1$ and $T_2$. The pressure generated by the regulator valve 32 is controlled by the above-described equation (2).

According to the above-described embodiment, a speed ratio e of the CVT 10 is controlled by the way that a volume of oil in the hydraulic cylinder of a driving pulley is controlled. It is possible to control a speed ratio e by the way that a volume of oil in the hydraulic cylinder of a driven pulley is controlled.

While the present invention has been described in its preferred embodiments, it is to be understood that the invention is not limited thereto, and may be otherwise embodied within the scope of the following claims.

What is claimed is:

1. An apparatus for controlling a rate of changing a RPM ratio in a continuously variable transmission connected to an engine, the transmission having a driving pulley mounted on an input shaft, the driving pulley comprising a fixed member and a movable member, the movable member being actuated by a hydraulic cylinder to form a V-shaped opening between the movable member and the fixed member, a driven pulley mounted on an output shaft, the driven pulley comprising another fixed member and another movable member, said another movable member being similarly actuated by another hydraulic cylinder to form another V-shaped opening between said another movable member and said another fixed member and an endless belt member spanning the pulleys so that an effective diameter of the pulleys can be varied at different rates with regard to each other so that different speed ratios can be obtained, comprising:

a first control means for detecting a signal which indicates a prompt acceleration of a vehicle, required by an operator;

a flow control means for draining an amount of oil supplied into said hydraulic cylinder within a first prescribed time period from the time when the prompt acceleration of the vehicle is detected by the first control means;

a second control means for maintaining an amount of oil supplied into said hydraulic cylinder to zero during a second prescribed time period after the first prescribed time period elapses; and a regulator means for supplying a pressurized line pressure into said flow control means and said another hydraulic cylinder, whereby the amount of oil drained from the hydraulic cylinder of the driving pulley is made to its maximum within the first prescribed time period, thereby promptly lowering the RPM ratio in the continuously variable transmission, and the draining of oil from the hydraulic cylinder of the driving pulley is stopped within the second prescribed time period, thereby maintaining a RPM ratio in a continuously variable transmission to the value at the time when the first prescribed time period elapses.

2. The apparatus of claim 1, wherein the first means detects a signal when an accelerator pedal is promptly pressed by a large stroke.

3. The apparatus of claim 1, wherein the first means detects a signal when a throttle opening is more than a first predetermined value and a differential value of the throttle opening is more than a second predetermined value.

4. The apparatus of claim 3, wherein the first predetermined value of a throttle opening is a value between 30 and 70 percentage, and the second predetermined value of the differential value of the throttle opening is a value between 50 and 200%/second.

5. The apparatus of claim 1, wherein the first prescribed time period is an amount between 0.5 and 1.0 second.

6. The apparatus of claim 4, wherein the second prescribed time period is an amount between 0.2 and 0.5 second.

* * * * *